United States Patent [19]

McElroy

[11] 4,446,592
[45] May 8, 1984

[54] NOZZLE ASSEMBLY

[76] Inventor: Lucian G. McElroy, 3315 Brocker Rd., Metamora, Mich. 48455

[21] Appl. No.: 425,686

[22] Filed: Sep. 28, 1982

[51] Int. Cl.$^3$ .............................................. B08B 1/00
[52] U.S. Cl. ................................................. 15/316 R
[58] Field of Search .................... 15/316 R, 354, 359, 15/362, 306 R, 312, 97 B; 118/305, 307, 323, 680; 134/45, 123; 239/590.5, 592, 593, 598, 600

[56] References Cited

U.S. PATENT DOCUMENTS

| | | | |
|---|---|---|---|
| 2,973,544 | 3/1961 | Romaniuk | 15/359 |
| 3,903,562 | 9/1975 | Miles | 15/316 R |
| 4,161,801 | 7/1979 | Day et al. | 15/316 R |

FOREIGN PATENT DOCUMENTS 267349 12/1968 Austria .......................... 15/DIG. 2

Primary Examiner—Philip R. Coe
Assistant Examiner—Arthur D. Dahlberg
Attorney, Agent, or Firm—Reising, Ethington, Barnard, Perry & Milton

[57] ABSTRACT

A nozzle assembly (26) to be connected to an outlet 24 of a flexible inflatable bag (18, 20) for emitting a stream of air under pressure therethrough to remove fluid from the surface of a vehicle including an elongated body portion, an inlet portion (36) defining a first elongated opening (37) and being adapted to be connected to the bag outlet (24), and a nozzle portion (38) defining a second opening (40) having a smaller area than the first opening (37). The nozzle assembly (26) is characterized by a plurality of rollers (50) and a plurality of projections (52) extending from and being integral with the nozzle portion (38) for supporting the rollers (50) longitudinally along the nozzle portion (38).

6 Claims, 6 Drawing Figures

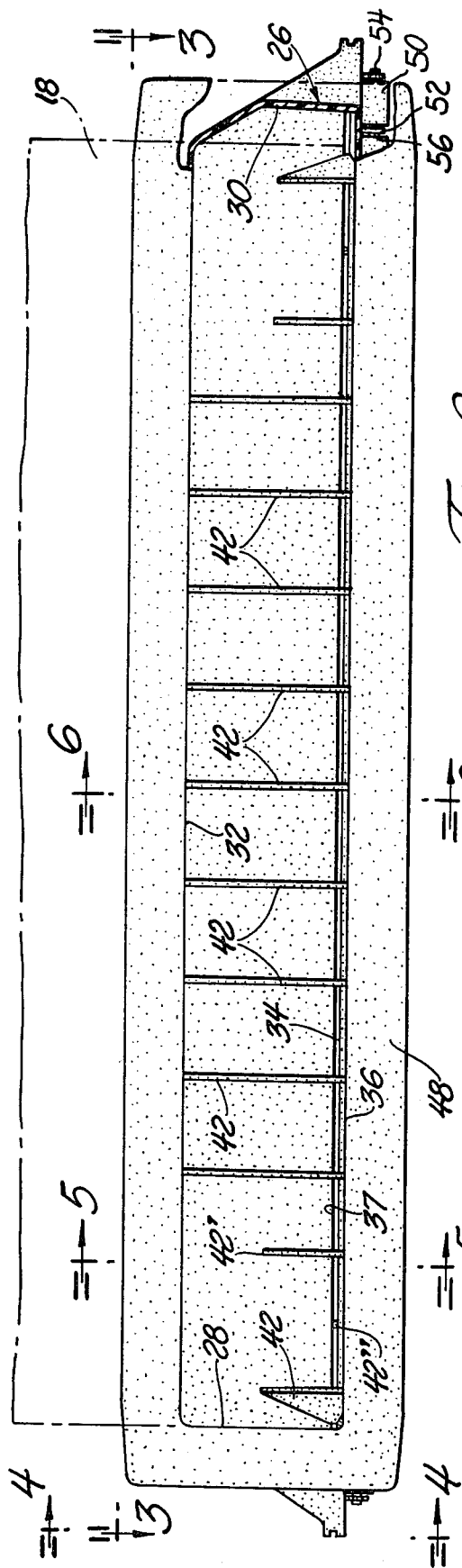

4,446,592

NOZZLE ASSEMBLY

TECHNICAL FIELD

This invention relates to an apparatus for stripping fluid from the surface of a vehicle. More specifically, the instant invention relates to a nozzle assembly to be secured to an outlet end of a bag used as an air distributor for releasing air under pressure from the bag.

BACKGROUND ART

It is now recognized that car wash systems including drying stations which utilize flexible inflatable bags with generally rectangular transverse cross section for removing fluid from a vehicle surface are presently the most economical means for drying vehicles. The systems effectively dry the vehicles while using a minimum amount of power to operate the system. An example of such a system is disclosed by the U.S. Pat. No. 4,161,801 to Day et al.

Generally, a nozzle assembly is fastened to the outlet end of the bag, the air under pressure being emitted through the bag and out of the nozzle assembly. The nozzle assembly may contact the surface of the vehicle as the vechicle passes through the drying station. Rollers have been connected to the end portion of the nozzle to engage the surface of the passing vehicle. Prior art assemblies have not included an effective means for supporting the rollers on the nozzle whereby the support means was sufficiently strong to withstand the stresses applied by the passing vehicle on the rollers. Additionally, prior art assemblies have included roller support means which were complex in structure and, therefore, costly to manufacture.

STATEMENT OF THE INVENTION

According to the present invention, there is provided a nozzle assembly to be connected to an outlet of a flexible inflatable bag having a substantially rectangular cross section of an apparatus for emitting a stream of air under pressure therethrough to remove fluid from the surface of a vehicle. The nozzle assembly includes an elongated body portion, an inlet portion defining a first elongated opening and being adapted to be connected to the bag outlet, and a nozzle portion defining a second opening having a smaller area than the first opening. The nozzle assembly is characterized by a plurality of rollers and support means being integral with the nozzle portion and extending therefrom for supporting the rollers longitudinally along the nozzle portion. Connecting means connect the rollers to the support means.

FIGURES IN THE DRAWINGS

Other advantages of the present invention will be readily appreciated as the same becomes better understood by reference to the following detailed description when considered in connection with the accompanying drawings wherein:

FIG. 2 is a plan view of the instant invention partially broken away and in cross section;

FIG. 3 is an elevational view taken substantially along lines 3—3 of FIG. 2;

DETAILED DESCRIPTION OF THE DRAWINGS

Figure 1:
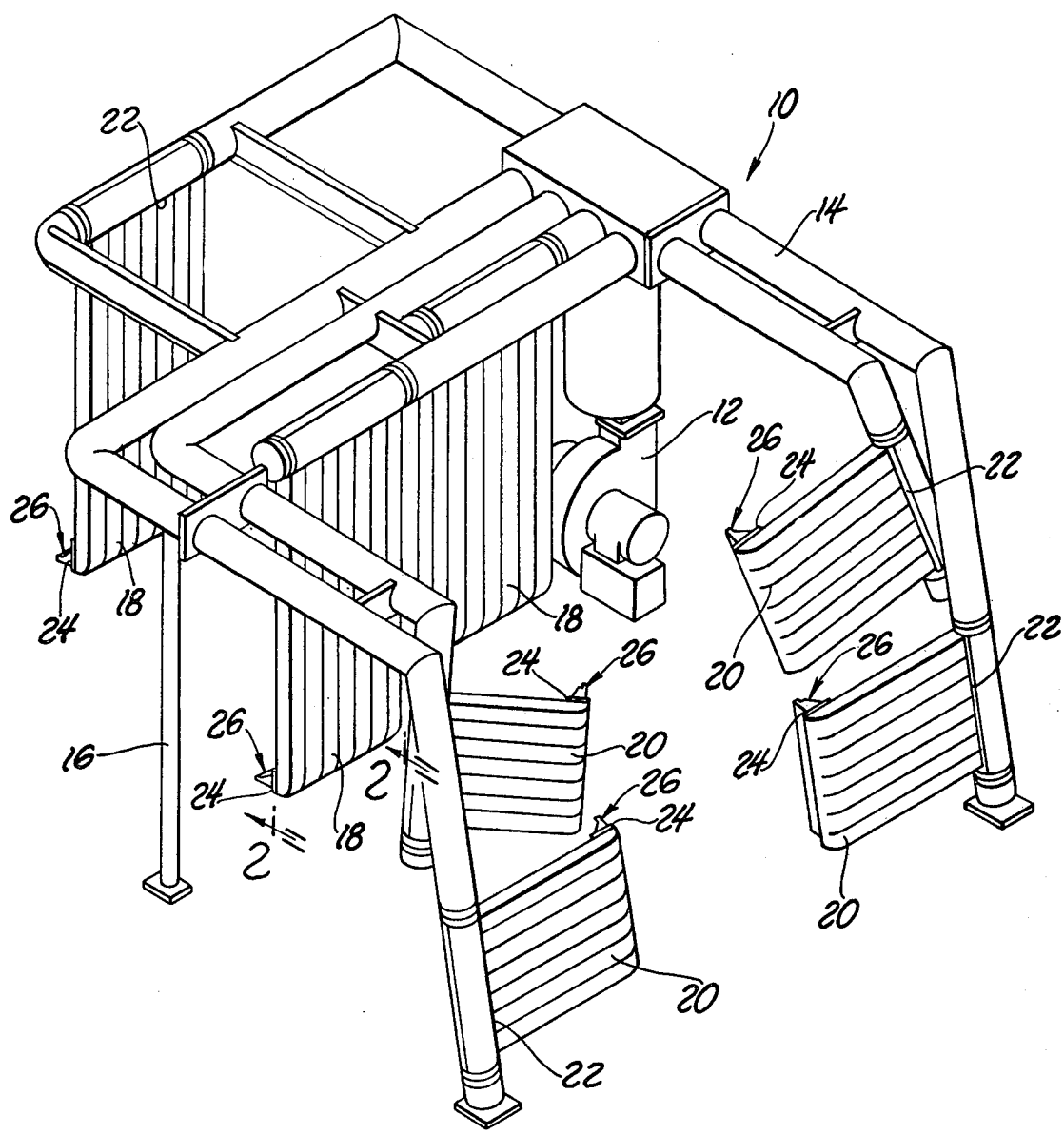
FIG. 1 is a perspective view of a drying station of a car wash system constructed in accordance with the instant invention.

Referring to the drawings, a drying station of a car wash system is generally shown at 10 in FIG. 1. The drying station 10 is constructed for stripping fluid from the surface of a vehicle as the vehicle is conveyed along a path through a car wash system. The drying station includes an air distributor including a fan assembly 12 and an overhead duct or plenum 14. Beams, such as beam member 16, may be used to support the plenum 14 from the floor of the car wash. The drying station 10 further includes a plurality of flexible bags, each having a generally rectangular transverse cross section. The station includes a plurality of vertically hanging bags 18 and substantially horizontally disposed bags 20. The bags 18, 20 are supported by the air distributor plenum 14 in an array along the path of a vehicle passing through the drying station in order to strip fluid from the top and side surfaces of the vehicle. Each of the bags 18, 20 include a bag inlet end 22 connected to the plenum 14 for introducing air under pressure into the bags 18, 20 and an outlet end 24 spaced from the inlet end 22. The assembly 10 further includes nozzle members generally indicated at 26 and shown in detail in FIGS. 2 through 6. The length of the horizontally extending bags 18 locates the nozzle members 26 at approximately bumper height while the bags 18, 20 are at rest. The substantially horizontally extending bags 20 have sufficient length so that the nozzle members 26 connected thereto will engage the oncoming vehicle. Due to the restriction at the outlet end of the bags 18, 20 provided by the nozzles 26, a back pressure is created which is greater than atmospheric pressure to keep the bags 18, 20 in an inflated condition. The pressure within the bags 18, 20 determines the flexibility of the bags 18, 20. In an inflated condition, the air pressure in the bags 18, 20 causes the bags 18, 20 to be somewhat stiffer or rigid. Hence, even though the bags 18, 20 are made from a flexible material, they are self-supporting when inflated.

Referring to FIGS. 2-6, the nozzle members 26 include an elongated body including a first pair of oppositely disposed side walls 28, 30. The walls 28, 30 are spaced a predetermined distance apart. The body further includes a second pair of oppositely disposed walls 32, 34. The walls, 32, 34 extend between the first pair of walls 28, 30 and are spaced from each other a greater distance than the spacing of the first pair of walls 28, 30. In other words, the body of the nozzle member 26 appears to be rectangular when viewed in transverse cross section as defined by the walls 28, 30, 32 and 34. The body further includes an inlet portion 36 defining a first elongated opening 37, the inlet portion 36 being adapted to be connected to the bag outlet 24. A flange 48 extends outwardly from the inlet portion 36. The flange 48 is disposed in a plane which is generally perpendicular to the wall 34. Means, such as rivets or velcro are used to connect the nozzle member 26 to the bag 18, 20 to provide a substantially air-tight seal connecting the bag outlet 24 to the flange 48. The body further includes a nozzle portion 38 defining a second opening 40 having a smaller area than the first opening 37.

Vane means extend between the second pair of walls 32, 34 of the nozzle member 26 for preventing the second pair of walls 32, 34 from being forced apart by the stream of air passing therethrough while minimally agitating the stream of air. In other words, the constricted nozzle portion 38 creates a back pressure within the bags 18, 20 and the nozzle member 26. The air pressure would normally have a tendency to separate the elongated second pair of walls 32, 34. The vane means 42 of the instant invention extending between the walls 32 and 34 present a minimal amount of resistance to the passing air and prevent the second pair of walls 32, 34 from being forced apart.

The vane means comprises a plurality of webs 42, as shown in FIG. 2. The webs 42 are narrow walls extending between the second pair of walls 32, 34 and are integral therewith.

Each of the second pair of walls 32, 34 includes an intermediate portion between the inlet portion 36 and nozzle 38. The intermediate portions converge towards each other from the inlet portion 36 to the nozzle portion 38. The nozzle portion 38 includes lips 44 and 46 extending from each of the second pair of walls 32, 34, respectively. The lips 44, 46 are substantially parallel relative to each other.

Figure 5:
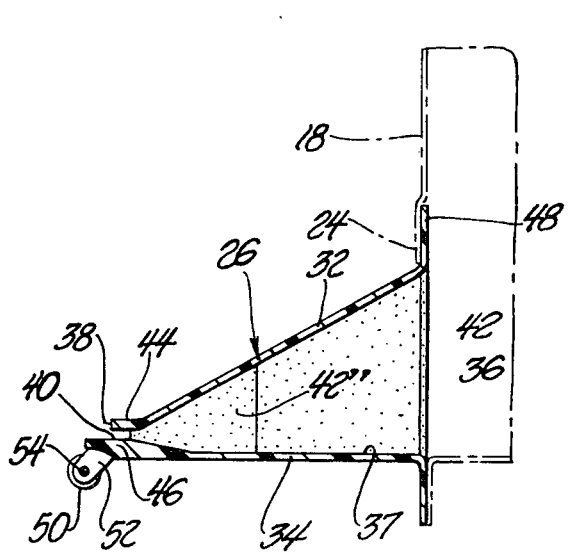
FIG. 5 is a cross-sectional view taken substantially along lines 5—5 of FIG. 2.
Figure 6:
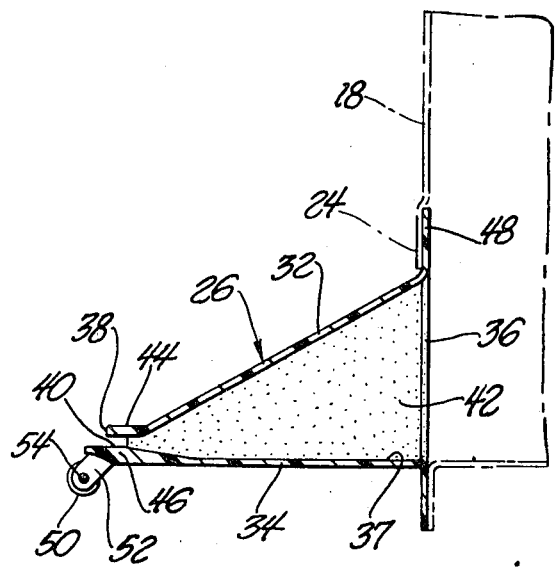
FIG. 6 is a cross-sectional view taken substantially along lines 6—6 of FIG. 2.

There are three configurations of webs. The more centrally located webs 42 are disposed between the intermediate portions of the nozzle member 26 and extend into the nozzle portions 38 between the lips 44, 46. The portions of the centrally located webs 42 extending into the nozzle portions 38 are substantially parallel relative to each other and integral with the lips 44, 46. The centrally located webs 42 are substantially planar and parallel relative to each other and extend from the inlet portion 36 to and within the lips 38, as shown in FIG. 6. As shown in FIG. 2, this first plurality of webs 42 are generally disposed within the central portion of the nozzle member 26. A second plurality of webs 42' are disposed longitudinally outside of the first plurality of webs 42, as shown in FIGS. 2 and 5. At least some of the second plurality of webs 42' have a peripheral edge extending between the intermediate portions of the body portion of the nozzle member 26, the peripheral edge being spaced from the inlet portion 36. The more centrally located ones of the second plurality of webs 42' are substantially planar and are parallel relative to each of the first plurality of webs 42 and to each other.

The first pair of walls 28, 30, as shown in FIGS. 2 and 3, flare outwardly from one another while extending from the inlet portion 36 towards the nozzle portion 38. The most peripherally disposed of the second plurality of webs 42' include planar portions extending between the intermediate portions of the nozzle member 26 and flare outwardly from one another in directions generally parallel to the adjacent first walls 28, 30. A third plurality of webs 42'' are disposed between the most peripheral of the second plurality of webs 42' and the more proximal of the second plurality of webs 42' and are planar and disposed solely between the lips 38, as shown in FIG. 2.

Unlike the frustoconical interconnecting portions of the prior art nozzle assemblies, the webs 42 of the instant invention agitate the air passing through the nozzle minimally while providing maximum structural support between the elongated walls 32 and 34.

Additionally, this configuration lends itself to injection molding, thereby not having the limitations of the prior art methods of manufacturing.

The nozzle 26 includes mounting means projecting from the inlet portion 36 for providing a mounting surface to be connected to the bag outlet 24. The mounting means includes a flange 48 disposed about the inlet portion 36 and projecting outwardly therefrom. The flange is disposed in a plane which is generally perpendicular to one of the first walls 28, 30.

The nozzle member 26 further includes a plurality of rollers 50 and support means for supporting the rollers 50 longitudinally along the nozzle portion 38. The support means extends integrally from the nozzle portion 38. The nozzle member 26 further includes connecting means for rotatably connecting the rollers 50 to the support means. More specifically, the support means includes a plurality of integral projections 52 extending from the lip 46 of nozzle portion 38. Each of the projections 52 has a bore therethrough being aligned with the remaining ones of the bores within each of the projections 52 to define an axis. The connecting means includes a rod 54 for supporting the rollers 50. The rod 54 is disposed through the bores and each of the rollers 50 are mounted on the rod 54 between a pair of the projections 52. Thusly, the projections provide a means integral to the nozzle member 26 for supporting the rollers 50. The rollers 50 engage a passing vehicle as the vehicle passes through the drying station 10 as the bags 18, 20 are deflected by the vehicle.

Washers 56 are disposed on the rod 54 between the rollers 50 and the projections 52 for facilitating the rotation of the rollers 50.

Figure 4:
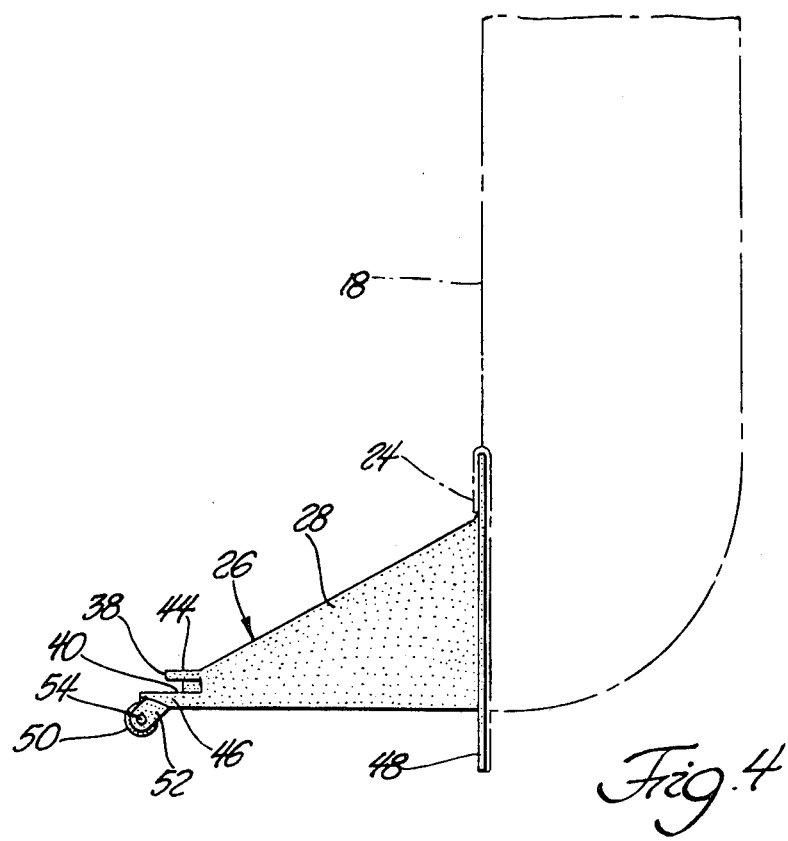
FIG. 4 is a fragmentary side elevational view taken substantially along lines 4—4 of FIG. 2.

As shown in FIGS. 4-6, the integral projections 52 are disposed at an included acute angle relative to the lip 46 from which it extends, the lip 46 being thicker than the integral one of the intermediate portions from which the lip 46 extends when viewed in cross section. Hence, the lip 46 is reinforced to withstand the impact of the rollers 50 and supporting projections 52 when a passing vehicle contacts the rollers 50 to deflect the bags 18, 20 from the path of the vehicle.

In operation, the flange 48 of the nozzle member 26 is fixedly connected to the outlet 24 of one of the bags 18, 20. As a vehicle passes through the drying station 10, the vehicle initially contacts the rollers 50 of the nozzle members 26. The reinforced supporting lips 46 support the projection 52 and rollers 50 which contact the vehicle. As the vehicle passes through the drying station 10, the bags 18, 20 are deflected and hinge about a hinge point to allow the vehicle to pass by the nozzle members 26. Air emitted under pressure from the nozzle members 26 removes fluid from the surface of the vehicles. The webs 42 of the nozzle member 26 allows the fluid under pressure to be emitted through the nozzle member 26 without separating the elongated walls 32, 34 of the nozzle member 26. The planar structure of the webs 42 provide a minimal deflection of the air as it passes through the nozzle member 26.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and not to be in any way limiting, the invention may be practiced otherwise as specifically described.

The embodiments of the invention in which an exclusive property or privilege is claimed are defined as follows:

1. A nozzle assembly (26) to be connected to an outlet (24) of a bag (18,20) having a substantially rectangular cross section of an apparatus (10) for emitting a stream of air under pressure therethrough to remove fluid from the surface of a vehicle, said assembly (26) comprising: an elongated body portion being substantially rectangular when viewed in cross section; an outlet portion (36) defining a first elongated opening (37) and being adapted to be connected to the bag outlet (24); a nozzle portion (38) defining a second opening (40) having a smaller area than said first opening (37); and characterized by a plurality of rollers (50), support means being integral with said nozzle portion (38) and extending therefrom for supporting said rollers (50) longitudinally along said nozzle portion (38), connecting means for connecting said rollers (50) to said support means, said support means including a plurality of integral projections (52) extending from said nozzle portion (38), each of said projections (52) having a bore therethrough being aligned with the remaining ones of said bores to define an axis, said connecting means including a rod (54) for supporting said rollers (50), said rod (54) being disposed through said bores and each of said rollers (50) being mounted on said rod (54) between a pair of said projections (52).

2. An assembly as set forth in claim 1 further characterized by including washers (56) disposed on said rod (54) between said rollers (50) and said projections (52) for facilitating the rotation of said rollers (50).

3. An assembly as set forth in claim 2 further characterized by two elongated lips (44, 46) extending from and being integral with the adjacent portion of said body portion and defining said nozzle portion (38), said lips (44, 46) being substantially parallel relative to each other, said projections (52) being disposed at an included acute angle relative to at least one of said lips (44, 46).

4. An assembly as set forth in claim 3 further characterized by said projections (52) extending from one of said lips (46), said one of said lips (46) being thicker than said adjacent integral portion of said body portion when viewed in cross section.

5. An apparatus (10) for stripping fluid from the surface of a vehicle as the vehicle is conveyed along a path through a car wash comprising: an air distributor (12,14); a plurality of bags (18,20) of a generally rectangular transverse cross section, said bags (18,20) supported by said air distribuitor (12,14) in an array along the path of the vehicle to strip fluid from the top and side surfaces of the vehicle, each of said bags (18,20) including a bag inlet end (22) connected to said air distributor (12,14) for introducing air under pressure into said bag (18,20) and an outlet end (24) spaced apart from said inlet end (22); and a nozzle member (26) including an elongated body portion; an inlet portion (36) defining a first elongated opening (37) and being connected to said bag outlet (24); a nozzle portion (38) defining a second opening (40) having a smaller area than said first opening (37) and characterized by a plurality of rollers (50) and support means being integral with said nozzle portion (38) and extending therefrom for supporting said rollers (50) longitudinally along said nozzle portion (38) and connecting means for connecting said rollers (50) to said support means, said support means including a plurality of integral projections (52) extending from said nozzle portion (38), each of said projections (52) having a bore therethrough being aligned with the remaining ones of said bores to define an axis, said connecting means including a rod (54) for supporting said rollers (50), said rod (54) being disposed through said bores and each of said rollers (50) being mounted on said rod (54) between a pair of said projections (52).

6. An apparatus as set forth in claim 5 further characterized by said nozzle member (26) including washers (56) disposed on said rod (54) between said rollers (50) and said projections (52) for facilitating the rotation of said rollers (50).

* * * * *